(12) United States Patent
Wilson

(10) Patent No.: US 10,749,380 B2
(45) Date of Patent: Aug. 18, 2020

(54) APPARATUSES AND RELATED METHODS FOR GENERATING WIRELESS STATUS INDICATIONS FOR A WIRELESS POWER TRANSFER SYSTEM

(71) Applicant: Integrated Device Technology, Inc., San Jose, CA (US)

(72) Inventor: David F. Wilson, Soquel, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 820 days.

(21) Appl. No.: 14/494,536

(22) Filed: Sep. 23, 2014

(65) Prior Publication Data
US 2016/0087471 A1    Mar. 24, 2016

(51) Int. Cl.
*H02J 7/00*    (2006.01)
*H02J 7/02*    (2016.01)
*H02J 5/00*    (2016.01)
*H02J 50/12*   (2016.01)

(52) U.S. Cl.
CPC ............ *H02J 50/12* (2016.02); *H02J 7/0047* (2013.01)

(58) Field of Classification Search
CPC ............ H01F 38/14; H02J 5/005; H02J 17/00
See application file for complete search history.

(56) References Cited

U.S. PATENT DOCUMENTS

| | | | | |
|---|---|---|---|---|
| 7,013,134 B2* | 3/2006 | Ikeda | ............ | H04W 88/02 455/414.1 |
| 2011/0127847 A1* | 6/2011 | Shih | ............ | H02J 50/10 307/104 |
| 2013/0091225 A1* | 4/2013 | Eaton | ............ | H02J 7/025 709/206 |
| 2013/0241293 A1* | 9/2013 | Yamaguchi | ............ | H02J 50/80 307/66 |
| 2014/0091634 A1* | 4/2014 | Mayo | ............ | H02J 17/00 307/104 |
| 2014/0266026 A1* | 9/2014 | Dowd | ............ | H02J 7/025 320/108 |
| 2016/0043563 A1* | 2/2016 | Porat | ............ | H02J 7/025 307/104 |

* cited by examiner

*Primary Examiner* — Rexford N Barnie
*Assistant Examiner* — Terrence R Willoughby
(74) *Attorney, Agent, or Firm* — Haynes and Boone, LLP

(57) ABSTRACT

A wireless status indicator for a wireless power transfer system includes an object configured to wirelessly generate power responsive to a magnetic flux field of a wireless power transmitter and to generate a status indication of the wireless power transfer system. A wireless power transfer system comprises a wireless power status indicator configured to wirelessly generate power responsive to a wireless power signal and to generate a status indication of the wireless power transfer system. A related method includes generating power by a wireless status indicator and generating a status indication responsive to a wireless power signal. The wireless status indicator is a separate stand-alone device than a wireless power transmitter and wireless power receiver involved in the wireless power transfer. The status indication corresponds to a state of wireless power transfer.

20 Claims, 3 Drawing Sheets

APPARATUSES AND RELATED METHODS FOR GENERATING WIRELESS STATUS INDICATIONS FOR A WIRELESS POWER TRANSFER SYSTEM

FIELD

Embodiments of the present disclosure relate generally to wireless power transfer and, more particularly, to apparatuses and related a method for wirelessly generating status indications for a wireless power transfer system.

BACKGROUND

Battery-powered devices (e.g., consumer electronic devices, electric and hybrid automobiles, etc.) are charged from a power source (e.g., AC power outlet) through a charging device. The charging device couples the battery to the power source through an adaptor. The cord extending between the power source and the battery-powered device can take up space. In situations where multiple devices require charging, each with their own charger and cord, the charging area can become cramped and inconvenient.

Approaches are being developed that use over-the-air or wireless power transmission between a transmitter and a receiver coupled to the electronic device. Wireless power transmission using inductive coils is one method considered as an un-tethered method for transferring power wirelessly through a coupled wireless power signal. In wireless power transmission, power is transferred by transmitting a wireless power signal through a transmit coil. On the receiver side, a receive coil may couple with the transmit coil through the wireless power signal, thus, receiving the transmitted power wirelessly. The distance between the transmitter coil and receive coil, at which efficient power transfer can take place, is a function of the transmitted energy, the distance, and the alignment of the power transfer coils. The coupling coefficient (k) is a function of the distance and alignment between the coils, the coil sizes, and materials. The power conversion efficiency (e.g., coupling factor, coupling quality) may be significantly improved if the coils are sized and operated at such a frequency that they are physically within the so-called "near-field zone" of each other.

Conventional wireless power charging systems may have an interface that informs the user of the status of the wireless power transfer system. The interface is electrically coupled via a wired connection with the power supply of the wireless power transmitter. The status indicator is typically an LED that flashes in some pattern corresponding to a particular status. The inventor has appreciated that in some situations, the status indicator may be difficult to locate for the user to see—particularly when integrating within objects that are difficult to run the required wires or that are optically opaque. As a result, conventional solutions have resulted in a disruption of an otherwise contiguous object, in status indicators being placed in locations that are inconvenient for the user to see and/or are obstructed by the receiving device being charged, among other issues.

BRIEF SUMMARY

Embodiments of the present disclosure include a wireless status indicator for a wireless power transfer system. The wireless status indicator includes an object configured to wirelessly generate power responsive to a magnetic flux field of a wireless power transmitter and to generate a status indication of the wireless power transfer system.

Another embodiment of the present disclosure includes a wireless power transfer system. The wireless power transfer system comprises a wireless power status indicator configured to wirelessly generate power responsive to a wireless power signal and to generate a status indication of the wireless power transfer system. The wireless power status indicator is a separate stand-alone device than a wireless power transmitter and a wireless power receiver.

Another embodiment of the present disclosure includes a method for wirelessly generating a status indication for a wireless power transfer system. The method comprises generating power by a wireless status indicator responsive to a wireless power signal, and generating a status indication by the wireless status indicator. The wireless status indicator is a separate stand-alone device than a wireless power transmitter and wireless power receiver involved in wireless power transfer. The status indication corresponds to a state of the wireless power transfer.

DETAILED DESCRIPTION

Figure 1:
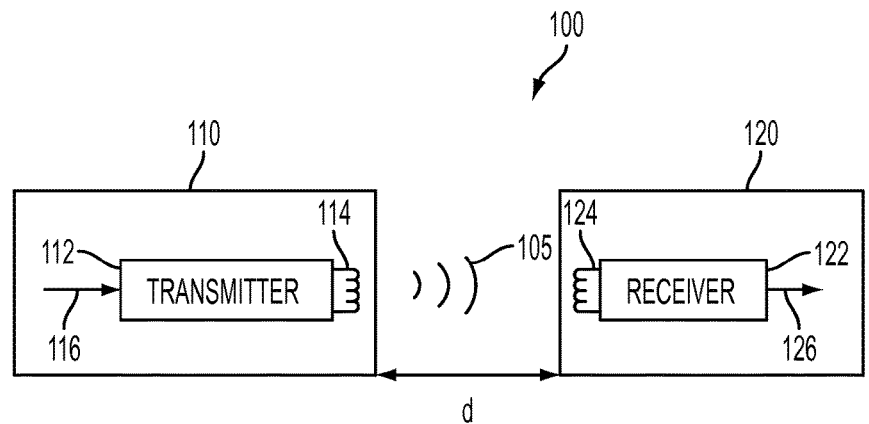
FIG. 1 is a schematic block diagram of a wireless power transfer system.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description.

It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, a controller, discrete gate or transistor logic, discrete hardware components, or any combination thereof designed to perform the functions described herein. All of which may be termed "control logic" or a "logic device."

A general-purpose processor may be a microprocessor, but in the alternative, the general-purpose processor may be any processor, controller, microcontroller, or state machine suitable for carrying out processes of the present disclosure. A processor may also be implemented as a combination of computing devices, such as a combination of a DSP and a microprocessor, a plurality of microprocessors, one or more microprocessors in conjunction with a DSP core, or any other such configuration.

A general-purpose processor may be part of a general-purpose computer, which should be considered a special-purpose computer when configured to execute instructions (e.g., software code) for carrying out embodiments of the present disclosure. Moreover, when configured according to embodiments of the present disclosure, such a special-purpose computer improves the function of a general-purpose computer because, absent the present disclosure, the general-purpose computer would not be able to carry out the processes of the present disclosure. The present disclosure also provides meaningful limitations in one or more particular technical environments that go beyond an abstract idea. For example, embodiments of the present disclosure provide improvements in the technical field of wireless power transfer and, more particularly, to apparatuses and related method for generating wireless status indications for a wireless power transfer system.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

It should be recognized that the devices of a wireless power transfer system is described herein primarily with respect to the functionality of wireless power transfer; however, it should be recognized that the wireless power transfer system may include additional components to perform other features not specifically described herein or shown in the various figures. For example, wireless power enabled devices may include communication modules, I/O modules for interfacing with a user, memory for storing instructions and data, various sensors, processors, controllers, voltage regulators, among other components. The figures and accompanying description may, therefore, be somewhat simplified to focus on the various apparatuses and methods that are configured to provide wireless power transfer and wireless status indication generation for the wireless power transfer system.

FIG. 1 is a schematic block diagram of a wireless power transfer system 100. The wireless power transfer system 100 includes a wireless power transmitting apparatus 110, and a wireless power receiving apparatus 120. The wireless power transmitting apparatus 110 includes a wireless power transmitter 112 having a transmit coil 114 configured to generate a wireless power signal 105 (e.g., electric field, magnetic field, electromagnetic field, etc.) for providing power transfer (e.g., through inductive coupling) to the wireless power receiving apparatus 120. The wireless power receiving apparatus 120 includes a wireless power receiver 122 having a receive coil 124 configured to couple with the wireless power signal 105. The transmit coil 114 and the receive coil 124 may be sized according to the particular devices and applications to be associated therewith.

An input signal 116 may be provided to the wireless power transmitter 112 for generating the wireless power signal 105 that provides a power transfer to the wireless power receiving apparatus 120. The wireless power receiver 122 may couple to the wireless power signal 105 and may generate an output signal 126 in response thereto. The output signal 126 may provide the power that is used by the wireless power receiving apparatus 120 for storing (e.g., charging a battery), consumption (e.g., providing system power), or a combination thereof.

The wireless power transmitter 112 and the wireless power receiver 122 are separated by a distance (d). In some embodiments, the wireless power transmitter 112 and the wireless power receiver 122 may be configured according to a mutual inductance relationship, such that when the resonant frequency of the wireless power receiver 122 and the resonant frequency of the wireless power transmitter 112 are substantially identical, transmission losses between the wireless power transmitter 112 and the wireless power receiver 122 are minimal. Likewise, the frequency of the wireless power signal 105 may be set by the wireless power transmitter 112 at or near the resonant frequencies of the coils 114, 124. As a result, an effective power transfer may occur by coupling a large portion of the energy in the near-field of the transmit coil 114 to the receive coil 124 rather than propagating most of the energy in an electromagnetic wave to the far-field. If the wireless power receiving apparatus 120 is in the near-field (within some distance (d)), inductive coupling may occur between the transmit coil 114 and the receive coil 124. The area around the transmit coil 114 and receive coil 124 where this near-field inductive coupling may occur may be referred to as a "coupling region." Because of this mutual inductance relationship, the wireless power transfer may be referred to as inductive wireless power transfer.

The transmit coil 114 and the receive coil 124 may be configured as a "loop" antenna, which may also be referred to herein as a "magnetic" antenna or an "inductive" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive coil 124 within a plane of the transmit coil 114 where the coupling region of the transmit coil 114 may be more powerful.

The wireless power receiving apparatus 120 may be a mobile electronic device, such as a cell phone, a smart phone, a media player (e.g., mp3 player, DVD player, etc.), an electronic reader, a tablet computer, a personal digital assistant (PDA), a camera, a laptop computer, and personal electronic device in which wireless power signal 105 may be received. The wireless power receiving apparatus 120 may also be a less mobile electronic device, such as a television, personal computer, media player (e.g., DVD player, Blu-ray player, etc.) or any other device that may operate by, and/or store electrical power. The wireless power receiving apparatus 120 may be one of a number of other items, such as an automobile or any other devices that may include batteries that may be charged through the wireless power transmitting apparatus 110.

The wireless power transmitting apparatus 110 may be a device that may, at times, also be the recipient of wireless power transfer. In other words, some devices may be configured as both a wireless power transmitting apparatus 110 and a wireless power receiving apparatus 120, such that the device may transmit wireless power or receive wireless power depending on the mode of operation. Thus, embodiments of the present disclosure include devices that may include a wireless charging transceiver configured to operate in either a transmit mode or a receive mode. Using the term "receiver" indicates that a device is configured to receive wireless power transfer, but should not be interpreted to mean that the device only operates as a receiver. Similarly, using the term "transmitter" indicates that the device is configured to transmit wireless power, but should not be interpreted to mean that the device only operates as a transmitter.

It may be desirable to provide the user with one or more status indicators for the wireless power transfer system 100. Some charging protocols (e.g., WPC) for wireless charging systems may provide the user with one or more status indications. A status may be that the transmitter is in an idle state (i.e., waiting for a receiver). Another status may be that a wireless power receiving apparatus 120 is present, but that charging is not occurring. Another status may be that charging is occurring. Another status may be that a charge is complete. Another status may be that charging is almost complete. Embodiments of the present disclosure include apparatuses and methods for generating one or more different status indicators to a user using a wireless status indicator that is not physically coupled with the wireless power transmitter 112 via wiring. Such a wireless status indicator may siphon (e.g. extract) energy wirelessly for powering the materials and/or devices used to generate the status indication. At least some of the siphoned energy may be from the wireless power transfer system 100. In some embodiments, at least some of the siphoned energy may be from other magnetic fields that may be present.

Figure 2:
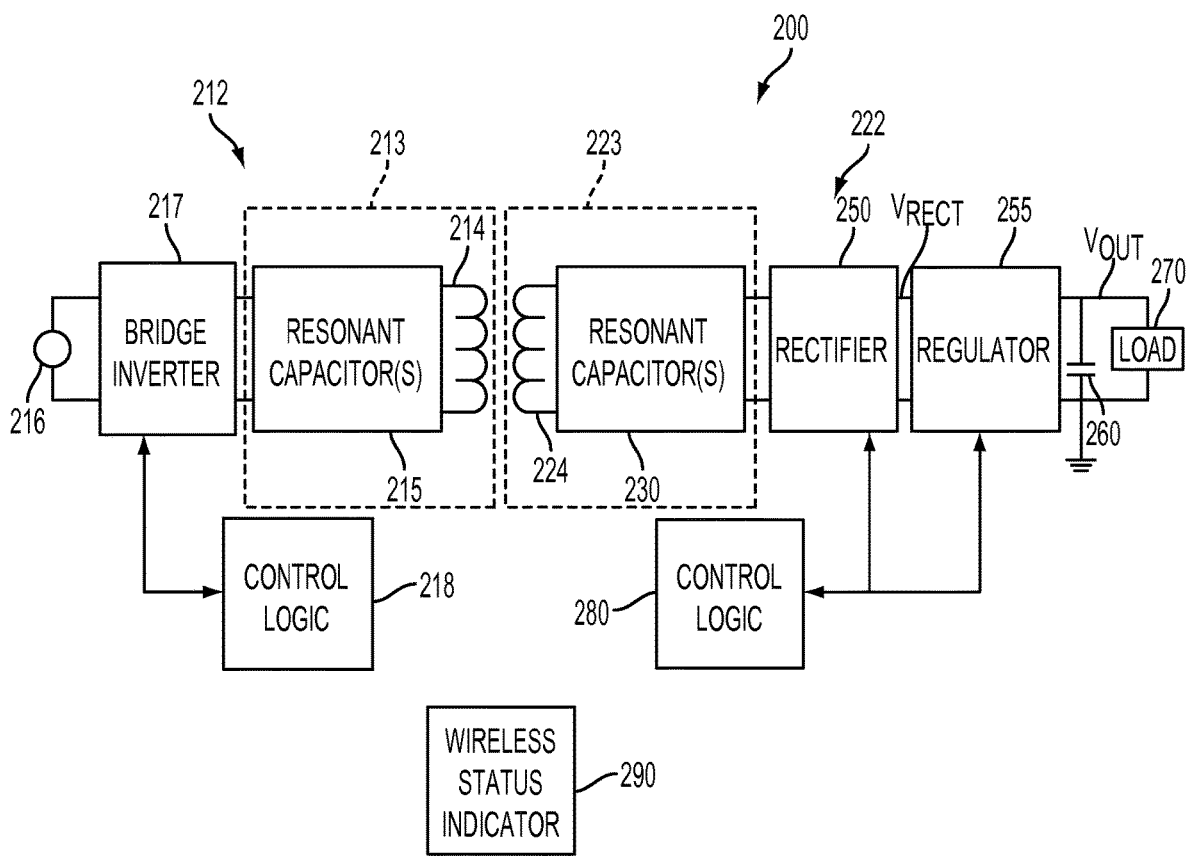
FIG. 2 is a schematic block diagram of a wireless power transfer system.

FIG. 2 is a schematic block diagram of a wireless power transfer system 200 according to an embodiment of the present disclosure. The wireless power transfer system 200 includes a wireless power transmitter 212 and a wireless power receiver 222. The wireless power transmitter 212 and the wireless power receiver 222 may be configured to couple with each other according to a mutual inductance relationship such that wireless power signal 105 (FIG. 1) may be transferred from the wireless power transmitter 212 to the wireless power receiver 222.

The wireless power transmitter 212 may include a resonant tank 213, a bridge inverter 217, and transmitter control logic 218 coupled together to generate the wireless power signal 105 transmitted to the wireless power receiver 222. The resonant tank 213 may include a transmit coil 214 coupled with resonant capacitors 215. The bridge inverter 217 of the wireless power transmitter 212 may include a full bridge inverter, a half bridge inverter, or other appropriate circuit for receiving a DC input signal 216 and generate an AC signal through the transmit coil 214 for generating the wireless power signal 105.

The wireless power receiver 222 includes a resonant tank 223, rectifier 250, and a regulator 255, and control logic 280 coupled together to receive the wireless power signal 105 and generate an output signal ($V_{OUT}$) in response thereto. The output signal ($V_{OUT}$) may be provided to a load 270 (e.g., a battery, system components, etc.), which may also have an output capacitor 260. The resonant tank 223 may include a receive coil 224 coupled with resonant capacitors 230. The wireless power transmitter 212 and the wireless power receiver 222 may be incorporated within a wireless power transmitting apparatus 110 (FIG. 1) and a wireless power receiving apparatus 120 (FIG. 1), respectively. The transmit coil 214 and the receive coil 224 (and other components) may be sized according to the particular devices and applications to be associated therewith.

The wireless power transmitter 212 and wireless power receiver 222 may be generally configured as discussed above with respect to FIG. 1. The configurations of the LC networks within the resonant tanks 213, 223 may generally determine the resonant frequencies of the wireless power transmitter 212 and the wireless power receiver 222, respectively. For example, the resonant frequency of the resonant tanks 213, 223 may be based on the inductance of their respective inductive coil and the capacitance of the plates of the capacitors.

During wireless power transmission, the input signal 216 (a DC signal) may be received by the bridge inverter 217. The bridge inverter 217 may generate an AC current that flows through the resonant tank 213 to generate a time-varying signal for transmitting the wireless power signal 105. Thus, the wireless power signal 105 may be a time-varying signal that is substantially sinusoidal, having a frequency that may be based on the switching frequency of the bridge inverter 217 of the wireless power transmitter 212. In some embodiments, the frequency of the wireless power signal 105 may be set according to the desired frequency, such as a frequency for a particular wireless power standard. The resonant tank 213 may be configured such that the resonant frequency is approximately the frequency of the wireless power signal 105. In some embodiments, it may be desirable for the frequency of the wireless power signal 105 to differ somewhat from the resonant frequency of the resonant tank 213, such as to reduce the peak-to-peak current through the transmit coil 214.

In order to receive wireless power signal 105, the wireless power receiver 222 may be placed in the coupling region of the wireless power transmitter 212 such that inductive coupling may be achieved. As a result, the wireless power receiver 222 may receive the wireless power signal 105 and generate an AC power responsive thereto. In order for the power to be used by the load 270, the AC power may be converted to a DC power. The rectifier 250 may generate a rectified voltage ($V_{RECT}$) as well as a rectified current ($I_{RECT}$) flowing through the resonant tank 223. In some embodiments, the rectifier 250 may be configured as a synchronous rectifier. As a result, the rectifier 250 may include one or more switches that are controlled in such a manner to generate the DC output power signal (i.e., rectified voltage ($V_{RECT}$) and rectified current ($I_{RECT}$)). In some embodiments, the rectifier 250 may include one or more diodes configured to generate the DC output power signal.

The regulator 255 may receive the rectified voltage ($V_{RECT}$) and convert the rectified voltage to have a desired voltage level for the output voltage ($V_{OUT}$). For example, in some embodiments, the regulator 255 may convert the rectified voltage ($V_{RECT}$) from a low voltage to a relatively higher voltage for the output voltage ($V_{OUT}$). In some embodiments, the regulator 255 may convert the rectified voltage ($V_{RECT}$) from a high voltage to a relatively lower voltage for the output voltage ($V_{OUT}$). In some embodiments, the regulator 255 may invert the rectified voltage ($V_{RECT}$) from a positive voltage to a negative voltage, or vice versa. The regulator 255 may be configured according to one of a variety of different voltage regulator topologies. For example, the regulator 255 may be configured according to one or more of a buck topology, a boost topology, a buck-boost topology, an inverting topology, and a low dropout (LDO) topology. In some embodiments, the regulator 255 may be configured according to a transformer-based topology (e.g., forward, flyback, etc.). The operation of the regulator 255 may be controlled by the control logic 280 according to the topology being used.

The control logic 280 of the wireless power receiver 222 may be configured to control one or more operations of the wireless power receiver 222. Each of the control logic 218, 280 may be implemented within a processor (e.g., microcontroller) or other circuitry that is configured (e.g., programmed) to perform various operations of embodiments of the present disclosure. Each of the control logic 218, 280 may further include computer-readable media (e.g., memory) storing computing instructions for execution by the processor related to performing processes of the embodiments of the present disclosure. Memory may include volatile and non-volatile memory. In addition, each of the control logic 218, 280 may further control other functions of the respective wireless power transmitter 212, wireless power receiver 222, such as controls related to foreign object detection, device operation, etc. The control logic 218, 280 may each include different sub-blocks that perform one or more of the above functions separately rather than by employing within a single process, routine, program, etc. In addition, the control logic 218, 280 may each employ different hardware elements for different functions.

The wireless power transfer system 200 may further include a wireless status indicator 290. The wireless status indicator 290 may be configured to wirelessly generate a status indication to provide the user with information regarding the status of the wireless power charging system 200. The status indication may be generated as one or more of a visual status indication, an audible status indication, a tactile status indication, and combinations thereof. A visual status indication may include a light being generated from a visual indicator (e.g., LED or other visual display element). An audible status indication may include an audible sound (e.g., beep, tone, voice, etc.) being generated by an audio source (e.g., speaker). A tactile status indication may include a tactile response (e.g., vibration) being generated by a tactile source (e.g., vibrating device).

The wireless status indicator 290 may be separate from the wireless power transmitting apparatus 110 (FIG. 1) and the wireless power receiving apparatus 120 (FIG. 1). In other words, the wireless status indicator 290 may be an adjunct device to the wireless power transmitting apparatus 110 and the wireless power receiving apparatus 120. To generate the status indication, the wireless status indicator 290 may be powered by inductively coupling with the wireless power signal 105 rather than through a wired connection with the wireless power transmitting apparatus 110. Thus, the wireless status indicator 290 may be configured to siphon at least some energy from the wireless power signal 105 while the wireless power transmitting apparatus 110 is transmitting the wireless power signal 105, such as during charging of the wireless power receiving apparatus 120. The energy siphoned off by the wireless status indicator 290 may be relatively small, such that any interference with the normal charging operation may be negligible (e.g., unimportant). In some embodiments, at least some of the energy received to power the wireless status indicator 290 may be received from sources other than the wireless power transfer system 100. Such other sources may include a connected device with a power source, another magnetic field, etc. In some embodiments, the wireless status indicator 290 may include a plurality of different components, such as a first component that senses the status information, which then transmits the status information to a second component that displays the status indication.

Figure 3:
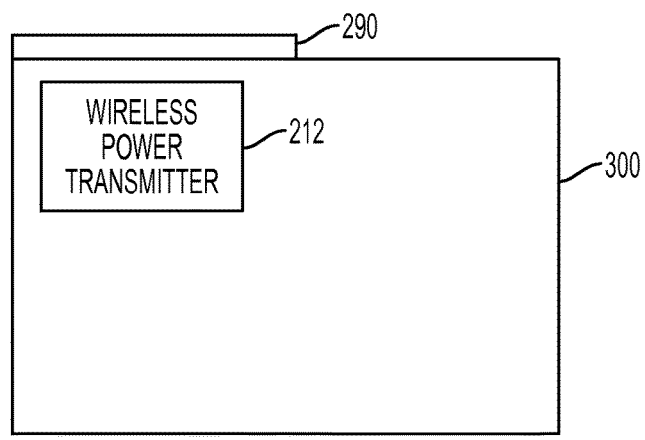
FIG. 3 is a schematic block diagram illustrating the wireless power transmitter integrated with another object, as well as the wireless status indicator disposed on the object.

FIG. 3 is a schematic block diagram illustrating the wireless power transmitter 212 integrated with another object 300, as well as the wireless status indicator 290 disposed on the object 300. The wireless power transmitter 212 may be integrated with the object 300 below the surface of the object 300. Embodiments of the present disclosure may include objects 300, such as furniture, audio/visual (AV) equipment, automobiles, and other objects that may be desirable for integrating the wireless power transmitter 212 therewith. Such objects may have an opaque surface, such that the wireless power transmitter 212 may be hidden from view to the user.

The wireless status indicator 290 may be a stand-alone object from the wireless power transmitter 212, such that the wireless status indicator 290 and the wireless power transmitter 212 are not physically coupled via wiring. As a result, the status indication may be provided to the user without passing wires through the object 300 supporting the wireless power transmitter 212 and/or without requiring a portion of the object 300 to be optically transparent so as to enable an optical status indicator beneath the surface of the object 300 to be visible. Thus, manufacturers of the object 300 (e.g., furniture makers or makers of other objects) may not be required to make surface penetrations to accommodate wiring and/or to integrate optically transparent elements into the opaque surfaces of their products. As a result, product costs may be reduced, production schedules shortened, and the aesthetic quality of the object 300 may be increased for objects 300 that integrate the wireless power transmitter 212.

As an example, the wireless status indicator 290 may be configured as a relatively thin pad that may be disposed on the object 300 in the proximity of the wireless power transmitter 212. Being disposed on the object 300 may include, for example, the wireless status indicator 290 being placed on, resting on, adhered to, attached to, connected to, etc. The pad may be formed from a flexible material, which may be desirable for conforming to objects 300 that are not flat. The wireless status indicator 290 may be removable and used with any wireless power transmitter 212 that generates the wireless power signal 105. The wireless status indicator 290 may be disposed proximate the wireless power transmitter 212 within the coupling region. In some embodiments, the wireless status indicator 290 may be disposed over the wireless power transmitter 212 such that the wireless power transmitter 212 is at least partially covered by the wireless status indicator 290 (i.e., the wireless status indicator 290 lies at least partially between the wireless power receiving apparatus 120 and the wireless power transmitter 212 during wireless power charging). In some embodiments, the wireless status indicator 290 may be disposed to the side of the wireless power transmitter 212 (i.e., the wireless status indicator 290 does not lie between the wireless power receiving apparatus 120 and the wireless power transmitter 212 during wireless power charging). As a result of being positioned off to the side, the status indication may be more easily viewed by the user. Thus, the wireless status indicator 290 may be an improvement over conventional methods because the user may receive the status indicator in a more clear, efficient, manner while also using the charging function in a normal and reasonable manner.

The wireless status indicator 290 may be configured to be coupled with the wireless power transmitter 212 through a mutual inductance relationship. The wireless status indicator 290 generate its own power used to generate the status indication responsive to the wireless power signal 105. For example, the wireless status indicator 290 may include a coil or other material that is configured to generate power responsive to the wireless power signal 105. In some embodiments, the wireless status indicator 290 may be a purely passive system that passively generates the power that is supplied to a status indication element responsive to being in the coupling region. In some embodiments, the wireless status indicator 290 may be a more complex active system that is configured to provide power to the status indication element in coordination with the wireless power transmitter 212 to provide a plurality of different status indications.

FIGS. 4-9 are schematic diagrams of wireless status indicators 290A-290F according to embodiments of the present disclosure. As discussed above, the wireless status indicators 290A-290F may be configured as a stand-alone device with the materials and/or devices integrated into a thin form factor (e.g., a pad). The wireless status indicators 290A-290F may be disposed on an object that has the wireless power transmitter 212 integrated therewith. The wireless status indicators 290A-290F may wirelessly couple with the wireless power signal 105, thereby eliminating the penetrations and/or discontinuities in the construction of the object integrated with the wireless power transmitter 212.

Figure 4:
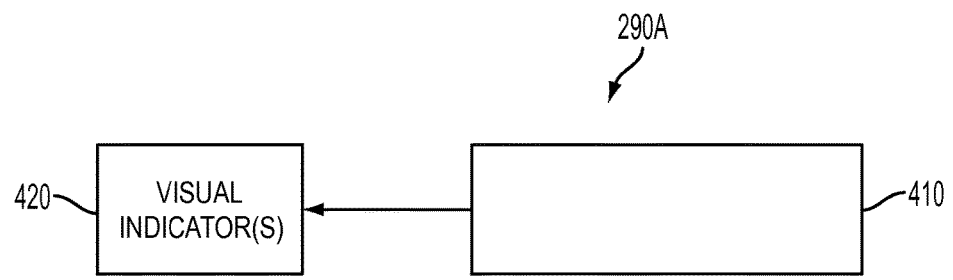
FIGS. 4-9 are schematic diagrams of wireless status indicators according to embodiments of the present disclosure.

Referring specifically to FIG. 4, the wireless status indicator 290A includes an energy siphoning coil 410 that is operably coupled with one or more visual indicator 420. The visual indicators 420 may generate the status indication responsive to the power generated by the energy siphoning coil 410. The power generated by the energy siphoning coil 410 may be generated responsive to the energy siphoning coil being inductively coupled with the wireless power transmitter 212. In operation, the energy siphoning coil 410 may generate a power signal when the wireless power transmitter 212 (FIG. 2) is transmitting the wireless power signal 105 (FIG. 1). In some embodiments, the transmission of the wireless power signal 105 may occur prior to charging (e.g., a low power transmission while awaiting a wireless power receiving apparatus). In addition, the transmission of the wireless power signal 105 may occur during wireless power transfer between the wireless power transmitter 212 and the wireless power receiving apparatus 120, during which time the wireless status indicator 290A may siphon at least some energy from the generated magnetic flux field.

The coupling between the energy siphoning coil 410 and the visual indicators 420 may be a direct connection such that the wireless status indicator 290A may be a passive device that generates power to the visual indicators 420 responsive being in the coupling region when the wireless power transmitter 212 is generating the wireless power signal 105. As a result, the visual indicator 420 may have two states (i.e., on/off) depending on whether power is generated by the energy siphoning coil 410. Thus, the number of statuses may be limited to whether or not the wireless power transmitter is transmitting the wireless power signal 105 at a sufficient level that is sensed by the energy siphoning coil 410. This status may be detected with or without a wireless power receiving apparatus 120 being present for actual charging. In some embodiments, the visual indicator 420 may be a passive device that generates a visual indication that is proportional to the amount of power provided by the energy siphoning coil 420. For example, for a light emitting device, the glow may be greater if the power is greater. As a result, the user may obtain information related to the strength of the magnetic field in addition with the status indication.

In some embodiments, the visual indicators 420 may include electroluminescent strips, LEDs (e.g., OLEDs), or other light-generating devices and/or materials. These devices and/or materials may generate the light responsive to the power generated by the energy siphoning coil 410. In some embodiments, the visual indicators 420 may require a different voltage than what is generated by the energy siphoning coil 410. In such embodiments, the wireless status indicator 290A may include a voltage converter (e.g., a step up converter, step down converter, etc.) to supply the visual indicators 420 with the needed voltage. In some embodiments, the visual indicators 420 may include non-light emitting materials that provide another form of visual indication (e.g., liquid crystal materials, monochrome E ink materials, etc.).

In some embodiments, the visual indicator 420 may include materials that may directly emit light responsive to being under stimulus of the wireless power signal 105. In other words, the material that generates the power responsive to the wireless power signal 105 may be the same material that emits light for the status indication. For example, the material may be a contiguous material that glows in the presence of a varying magnetic field. As a result, the material itself may be magneto-luminescent and the energy siphoning coil 410 may not be needed.

In some embodiments, the energy siphoning coil 410 may include a single loop coil. In some embodiments, the energy siphoning coil 410 may include a multiple loop coil. The energy siphoning coil 410 may be formed from copper traces on a printed circuit board with the visual indicators 420. In some embodiments, the energy siphoning coil 410 may be formed as an external wire that is coupled to the PCB, embedded within the PCB, or otherwise coupled with the visual indicators 420. Various geometries for the energy siphoning coil 410 are contemplated, including, but not limited to rectangular, triangular, circular, etc. In some embodiments, a loop wire may be integrated in a fabric. Such an embodiment may be coupled with an electroluminescent material. In some embodiments, an OLED material or non-light emitting indicating material may be coupled with a wire loop. Such embodiments may have materials that provide the desired function, and may not have involve a PCB. While one energy siphoning coil 410 is shown in FIG. 4 (and other figures), more or fewer energy siphoning coils may be used depending on the area desired to be covered by the wireless status indicator 290, the amount of siphoned power needed, the number of visual indicators 420, etc.

Figure 5:
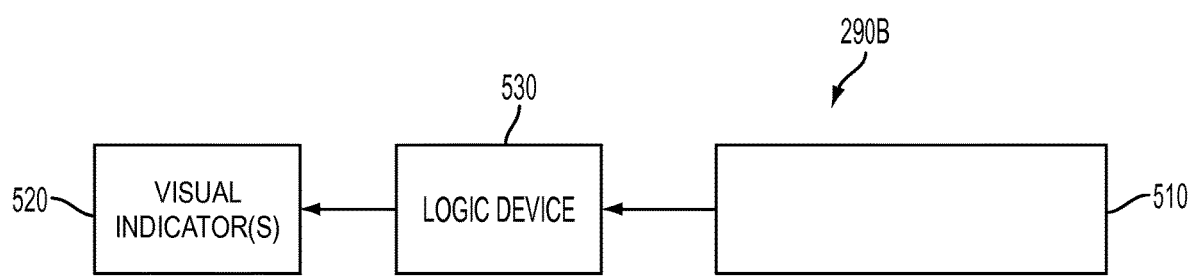

Referring specifically to FIG. 5, the wireless status indicator 290B includes an energy siphoning coil 510 that is operably coupled with one or more visual indicators 520 through a logic device 530. The logic device 530 may be configured to provide active control of the visual indicators 520 to operate according to a plurality of different states. As a result, a plurality of different status indications may be generated. For example, the logic device 530 may be configured to determine what state the wireless charging system 100 is in, and control the visual indicators 520 accordingly for the user to distinguish between states. Different states may include an idle state, a receiver present state, a charging state, a charge complete state, a charge almost complete state, an error state, a foreign object present state, among others. The logic device 530 may be configured to communicate with the wireless power receiving apparatus 120 and/or the wireless power transmitting apparatus 110 to receive information regarding the present state of the wireless power charging system 100. For example, the wireless power transmitter may modify its output to be interpreted by control logic of the wireless status indicator. In some embodiments, the information may be encoded information, and the logic device 530 may be configured to decode the information and control the visual indicators 520 to indicate the status indication for the corresponding state. For example, the logic device 530 may control the visual indicators 520 to operate in different a different manner (e.g., flash, blink, intensity, color, visual pattern, etc.) according to the corresponding state. In some embodiments, the wireless power transmitting apparatus 110 and/or the wireless power receiving apparatus 120 may modify the magnetic flux field such that even a passive system may responsively provide a status indication according to the modified magnetic flux field. For example, the changing flux field may cause the wireless status indicator to fade in and out of strength or operate according to a pattern that may be understood by the user to correspond to a particular state.

Figure 6:
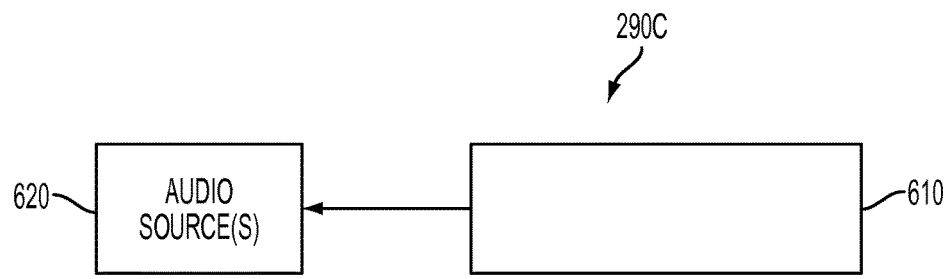

Referring specifically to FIG. 6, the wireless status indicator 290C includes an energy siphoning coil 610 that is operably coupled with one or more audio sources 620. The coupling between the energy siphoning coil 610 and the audio sources 620 (e.g., speakers) may be a direct connection such that the wireless status indicator 290C may be a passive device that generates power to the audio sources 620 responsive being in the coupling region when the wireless power transmitter 212 is generating the wireless power signal 105. As a result, the audio source 620 may have two states (i.e., on/off) depending on whether power is generated by the energy siphoning coil 610. Thus, the number of statuses may be limited to whether or not the wireless power transmitter 212 is transmitting the wireless power signal 105 at a sufficient level that is sensed by the energy siphoning coil 610. This status may be detected without a wireless power receiving apparatus 120 being present for actual charging.

Figure 7:
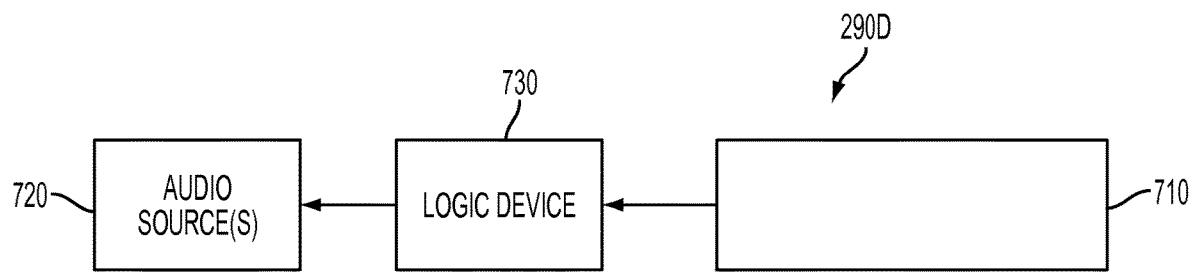

Referring specifically to FIG. 7, the wireless status indicator 290D includes an energy siphoning coil 710 that is operably coupled with one or more audio sources 720 through a logic device 730. The logic device 730 may be configured to provide active control of the audio sources 720 to operate according to a plurality of different states. As a result, a plurality of different status indications may be generated. For example, the logic device 730 may be configured to determine what state the wireless charging system 100 is in, and control the audio sources 720 accordingly for the user to distinguish between states. The logic device 730 may be configured to communicate with the wireless power receiving apparatus 120 and/or the wireless power transmitting apparatus 110 to receive encoded information regarding the present state of the wireless power charging system 100. The logic device 730 may be configured to decode the information and control the audio sources 720 to indicate the status indication for the corresponding state. For example, the logic device 730 may control the audio sources 720 to operate in different a different manner (e.g., volume, tone, beep, audio pattern, voice, etc.) according to the corresponding state.

Figure 8:
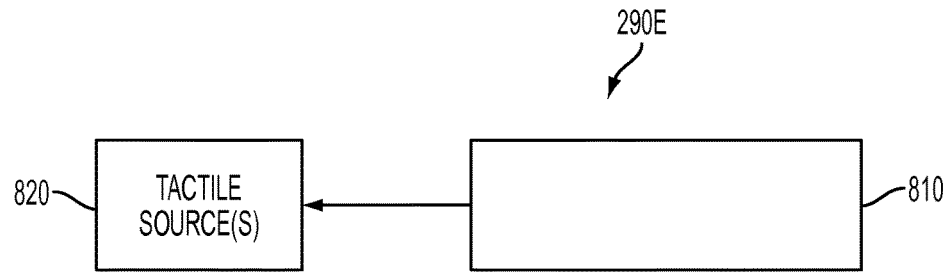

Referring specifically to FIG. 8, the wireless status indicator 290E includes an energy siphoning coil 610 that is operably coupled with one or more tactile sources 820. The coupling between the energy siphoning coil 810 and the tactile sources 820 (e.g., vibrating element) may be a direct connection such that the wireless status indicator 290E may be a passive device that generates power to the tactile sources 820 responsive being in the coupling region when the wireless power transmitter 212 is generating the wireless power signal 105. As a result, the tactile source 820 may have two states (i.e., on/off) depending on whether power is generated by the energy siphoning coil 810. Thus, the number of statuses may be limited to whether or not the wireless power transmitter 212 is transmitting the wireless power signal 105 at a sufficient level that is sensed by the energy siphoning coil 810. This status may be detected without a wireless power receiving apparatus 120 being present for actual charging.

Figure 9:
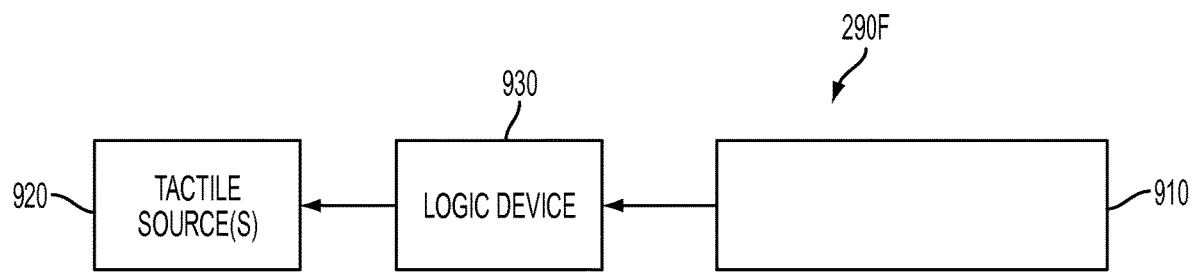

Referring specifically to FIG. 9, the wireless status indicator 290F includes an energy siphoning coil 910 that is operably coupled with one or more tactile sources 920 through a logic device 930. The logic device 930 may be configured to provide active control of the tactile sources 920 to operate according to a plurality of different states. As a result, a plurality of different status indications may be generated. For example, the logic device 930 may be configured to determine what state the wireless charging system 100 is in, and control the tactile sources 920 accordingly for the user to distinguish between states. The logic device 930 may be configured to communicate with the wireless power receiving apparatus 120 and/or the wireless power transmitting apparatus 110 to receive encoded information regarding the present state of the wireless power charging system 100. The logic device 930 may be configured to decode the information and control the tactile sources 920 to indicate the status indication for the corresponding state. For example, the logic device 930 may control the tactile sources 920 to operate in different a different manner (e.g., vibration pattern) according to the corresponding state.

Audible and/or tactile status elements may be particularly desirable for the visually impaired. In addition, in the audio and tactile methods, the audio and vibrating elements may be positioned at different locations than on the surface of the object 300 (FIG. 3). For example, the audio and vibrating elements may be located with the wireless power transmitter that is integrated with the object 300. Of course, being present with a pad at the surface may still be desirable for other reasons, such as having the indicator being better detectable by the user and/or to be transported and used with different wireless power transfer systems 100.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the disclosure. In addition, features from one embodiment may be combined with features of another embodiment while still being encompassed within the scope of the disclosure as contemplated by the inventor.

What is claimed is:

1. A wireless status indicator for a wireless power transfer system, the wireless power transfer system including a wireless power transmitter that provides power to a wireless power receiver, the wireless status indicator comprising:
    a stand-alone pad, physically separated from the wireless power transmitter and the wireless power receiver,
    a display incorporated with the stand-alone pad, the display configured to provide a status indication of the wireless power transmitter to a user, and
    an energy siphoning coil disposed within the stand-alone pad,
    wherein, when the stand-alone pad is positioned proximate to the wireless power transmitter, the energy siphoning coil samples a wireless power signal generated by the wireless power transmitter for transmission to the wireless power receiver to provide a sampled signal, the sampling of the wireless power signal siphoning an amount of energy from the wireless power signal that has negligible effect on the power transfer to the wireless power receiver, and
    wherein the wireless status indicator is configured to wirelessly generate power with the energy siphoning coil responsive to the sampled signal and configured to generate the status indication of the wireless power transfer system based on the sampled signal.

2. The wireless status indicator of claim 1, wherein the wireless status indicator includes one or more visual indicators configured to provide a visual indication corresponding to a state of the wireless power transfer system as the status indication.

3. The wireless status indicator of claim 1, wherein the wireless status indicator includes one or more audio sources configured to generate an audible sound corresponding to a state of the wireless power transfer system as the status indication.

4. The wireless status indicator of claim 1, wherein the wireless status indicator includes one or more tactile sources configured to generate a tactile response corresponding to a state of the wireless power transfer system as the status indication.

5. The wireless status indicator of claim 1, wherein the stand-alone pad is affixed to a surface proximate to the wireless power transmitter.

6. The wireless status indicator of claim 1, wherein the stand-alone pad is conformable to a surface proximate to the wireless power transfer system.

7. The wireless status indicator of claim 1, wherein the wireless status indicator is configured as a passive system.

8. A wireless power transfer system, comprising:
    a wireless power transmitter; and a wireless power status indicator comprising
        a stand alone pad, physically separated from the wireless power transmitter and a wireless power receiver,
        a display incorporated with the stand-alone pad, the display configured to provide a status indication of the wireless power transmitter to a user,
        an energy siphoning coil disposed within the stand-alone pad,
        wherein, when the stand-alone pad is positioned proximate to the wireless power transmitter, the energy siphoning coil samples a wireless power signal generated by the wireless power transmitter for transmission to the wireless power receiver to provide a sampled signal, the sampling of the wireless power signal siphoning an amount of energy from the wireless power signal that has negligible effect on the power transfer to the wireless power receiver, and
        wherein the wireless power status indicator is configured to wirelessly receive power from the energy siphoning coil responsive to the sampled signal and configured to generate the status indication of the wireless power transfer system based on the sample signal.

9. The wireless power transfer system of claim 8, wherein the wireless power transmitter is further configured to modify a wireless power signal according to a state for the wireless power status indicator to responsively generate the status indication.

10. The wireless power transfer system of claim 8, wherein the wireless power transmitter is integrated within an object.

11. The wireless power transfer system of claim 10, wherein the object has an opaque surface.

12. The wireless power transfer system of claim 10, wherein the power wireless status indicator is attached to a surface of the object.

13. The wireless power transfer system of claim 8, wherein the stand-alone pad is conformable to a surface of the wireless power transmitter.

14. The wireless power transfer system of claim 8, wherein the status indication corresponds to one of a plurality of different states for the wireless power transfer system.

15. The wireless power transfer system of claim 14, wherein the plurality of different states includes one or more of the following states: an idle state, a receiver present state, a charging state, a charge complete state, a charge almost complete state, an error state, a foreign object present state.

16. A method for wirelessly generating a status indication for a wireless power transfer system, the method comprising:
    generating power within a wireless status indicator responsive to a wireless power signal from a wireless power transmitter, the wireless status indicator being a separate stand-alone device from the wireless power transmitter and a wireless power receiver involved in wireless power transfer, the separate stand-alone device being disposed proximate to the wireless power transmitter, wherein the wireless power signal is sampled by an energy siphoning coil and provides a sampled signal by sampling a negligible amount of power from the wireless power signal; and
    generating a status indication by the wireless status indicator, wherein the wireless status indicator is separate from the wireless power transmitter and the wireless power receiver, configured to generate a display of the status indication of the wireless power transmitter to a user, the status indication corresponding to a state of the wireless power transfer system.

17. The method of claim 16, wherein generating power by the wireless status indicator includes siphoning energy during a wireless power transfer between the wireless power transmitter and the wireless power receiver.

18. The method of claim 16, wherein generating power by the wireless status indicator includes generating power with an energy siphoning coil.

19. The method of claim 18, wherein the energy siphoning coil is coupled with an indication element.

20. The method of claim 16, wherein generating a status indication by the wireless status indicator includes generating one or more of a visual status indication, an audible status indication, and a tactile status indication.

\* \* \* \* \*